United States Patent
Rinaldi et al.

(10) Patent No.: US 12,429,115 B2
(45) Date of Patent: Sep. 30, 2025

(54) SYSTEM AND METHOD FOR SHIFTING IN A DUAL MOTOR TRANSMISSION

(71) Applicant: DANA ITALIA S.R.L., Arco (IT)

(72) Inventors: Pier Paolo Rinaldi, Arco (IT); Giacomo Faggiani, Rovereto (IT); Mark Slater, Warwickshire (GB)

(73) Assignee: DANA ITALIA S.R.L., Arco (IT)

(*) Notice: Subject to any disclaimer, the term of this patent is extended or adjusted under 35 U.S.C. 154(b) by 140 days.

(21) Appl. No.: 18/450,951

(22) Filed: Aug. 16, 2023

(65) Prior Publication Data

US 2025/0060022 A1    Feb. 20, 2025

(51) Int. Cl.
*F16H 3/00* (2006.01)
*B60K 1/02* (2006.01)
*B60K 17/08* (2006.01)

(52) U.S. Cl.
CPC .............. *F16H 3/006* (2013.01); *B60K 1/02* (2013.01); *B60K 17/08* (2013.01); *F16H 2200/0021* (2013.01)

(58) Field of Classification Search
CPC .......... F16H 3/006; F16H 3/003; F16H 3/091; F16H 2003/0826; F16H 2200/0021; B60L 15/2054
See application file for complete search history.

(56) References Cited

U.S. PATENT DOCUMENTS

| | | | |
|---|---|---|---|
| 2021/0206256 A1* | 7/2021 | Hwang | B60K 6/387 |
| 2021/0379978 A1 | 12/2021 | Van Dingenen et al. | |
| 2023/0138771 A1* | 5/2023 | Dengler | F16H 3/093 |
| | | | 180/65.1 |

FOREIGN PATENT DOCUMENTS

| | | | | |
|---|---|---|---|---|
| CN | 216374144 U | | 4/2022 | |
| CN | 218777414 U | * | 3/2023 | ............ B60K 17/12 |
| EP | 2081789 B1 | | 6/2012 | |

OTHER PUBLICATIONS

FIT translation (Year: 2023).*
Rinaldi, P. et al., "System and Method for Seamless Shifting in a Dual Motor Transmission With Minimal Gears," U.S. Appl. No. 18/161,790, filed Jan. 30, 2023, 39 pages.

* cited by examiner

*Primary Examiner* — Huan Le
(74) *Attorney, Agent, or Firm* — McCoy Russell LLP

(57) ABSTRACT

Methods and systems for a transmission. In one example, the transmission system includes a first electric motor that is rotationally coupled to a first shaft with a first gear idly mounted thereto and a second electric motor that is rotationally coupled to a second shaft with a second gear idly mounted thereto. The transmission system further includes an intermediate shaft with a third gear fixedly coupled thereto, a first clutch configured to selectively rotationally couple the first gear and the first shaft, and a second clutch configured to selectively rotationally couple the second gear and the second shaft.

17 Claims, 11 Drawing Sheets

| Transmission drive ranges | Clutch (232) & Electric Motor (222) State | Motor (222) direction | Clutch (236) & Electric Motor (224) State | Motor (224) direction |
|---|---|---|---|---|
| DRNN | Neutral | ↻↺ | Neutral | ↻↺ |
| DR11 | 1st speed | ↻ | 1st speed | ↻ |
| DRN1 | Neutral | ↻ | 1st speed | ↻ |
| DR21 | 2nd speed | ↻ | 1st speed | ↻ |
| DR2N | 2nd speed | ↻ | Neutral | ↻↺ |
| DR22 | 2nd speed | ↻ | 2nd speed | ↺ |
| DRN2 | Neutral | Degraded | 2nd speed | ↻↺ |
| DR1N | 1st speed | ↻↺ | Neutral | Degraded |

FIG. 4A

SYSTEM AND METHOD FOR SHIFTING IN A DUAL MOTOR TRANSMISSION

TECHNICAL FIELD

The present disclosure relates generally to a mechanical transmission system with multiple transmission drive ranges.

BACKGROUND AND SUMMARY

Some single speed ratio transmissions of electric vehicles (EVs) attempt to achieve high maximum vehicle speeds and provides high torque at low speeds. However, sizing the motor to favor high torque results in poor vehicle top speed whereas sizing the motor based on targeting the vehicle maximum speed may hinder tractive performance at lower speeds. As such, incorporating a single speed ratio transmission may result in oversizing the motor. The demanded torque and maximum vehicle speed may be relaxed by utilizing a transmission with two or more speed ratios.

CN 216374144 U teaches a double-motor drive axle assembly with two gear shifters arranged on separate input shafts and an output shaft which is positioned coaxial to a differential. In the drive axle assembly, the associated gear reductions for the different speeds formed between the gears on the input shafts and the gears on the output shaft are identical.

The inventors have recognized various issues in previous electric powertrains and specifically the drive axle assembly disclosed in CN 216374144 U. For example, some multi-speed transmissions may experience undesirable tradeoffs between torque interruptions and drag torque during shifting transients, thereby decreasing the transmission's shifting performance. Further issues with regards to seamless shifting include oversizing the motor to compensate for power dissipation during clutch handover may be experienced in certain electric transmissions. The powertrain disclosed in CN 216374144 U uses identical gear reductions for the lower speed, which decreases the time span available for seamless shifting.

To at least partially address the aforementioned issues, a transmission system is provided. The transmission system includes, in one example, a first electric motor that is rotationally coupled to a first shaft with a first gear idly mounted thereto. The transmission system further includes a second electric motor that is rotationally coupled to a second shaft with a second gear idly mounted thereto. The transmission system even further includes an intermediate shaft with a third gear fixedly coupled thereto. Still further the transmission system includes a first clutch configured to selectively rotationally couple the first gear and the first shaft and a second clutch configured to selectively rotationally couple the second gear and the second shaft. In the transmission system, the third gear meshes with the first gear and a fourth gear that meshes with the second gear, and the first gear and the second gear are equally sized. In this way, the electric motors are able to utilize full power in a second speed due to the motors being geared to the output shaft with the same reduction ratio. Further, the transmission system may utilize fewer components (e.g., gears, shafts, and the like), if desired, while achieving a desired number of gear modes. Therefore, as a result of the utilizing fewer system components, such as gears and the like, in the disclosed simplified configuration, manufacturing costs may be reduced due to reducing spatial aspects of the system with the advantage of increasing efficiency of seamless shifting with decreased torque interruption.

In one example, the first and second clutches may be dog clutches. Using dog clutches, when compared to wet friction clutches, allows the transmission efficiency to be increased. Further, in such an example, synchronizers may be omitted from the transmission system, thereby decreasing system complexity. In such an example, the first electric motor may be speed matched with the first gear prior to engagement of the first clutch with the first gear to enable torque transfer between the first shaft and the first gear. In this way, shifting is able to take place with little or no power interruptions, if desired.

By utilizing the disclosed configuration of the transmission system, seamless shifting without a perceived decrease in tractive effort may be achieved by reducing power dissipation in existing systems. In another example, the transmission system may further include a fifth gear idly mounted to the first shaft and a sixth gear idly mounted to the second shaft. In such an example, the transmission system further includes a seventh gear fixedly coupled to the intermediate shaft and meshing with the fifth gear and the sixth gear, where the first clutch is configured to selectively rotationally couple the fifth gear and the first shaft and the second clutch is configured to selectively rotationally couple the sixth gear and the second shaft. In such an example, the fifth gear and the sixth gear are unequally sized. Equally sizing the fifth and sixth gear allows the time span available for seamless shifting to be increased without decreasing shifting performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF FIGURES

FIG. 4A shows a table that denotes different transmission drive ranges in the transmission system, depicted in FIGS. 2 and 3.

DETAILED DESCRIPTION

A transmission system with two or more selectable gears is described herein. In one embodiment, the transmission system is a multi-speed transmission which includes multiple shafts and an intermediate shaft coupled to dual motors.

An arrangement of gears and clutches allows the system to achieve gearshifts without decreasing the system's efficiency and increasing shifting performance by reducing the frequency of perceived jerks of the vehicle, if desired. In addition, dog clutches or other low friction clutches are used to enable efficient and seamless gearshifts without torque interruption.

Figure 1:
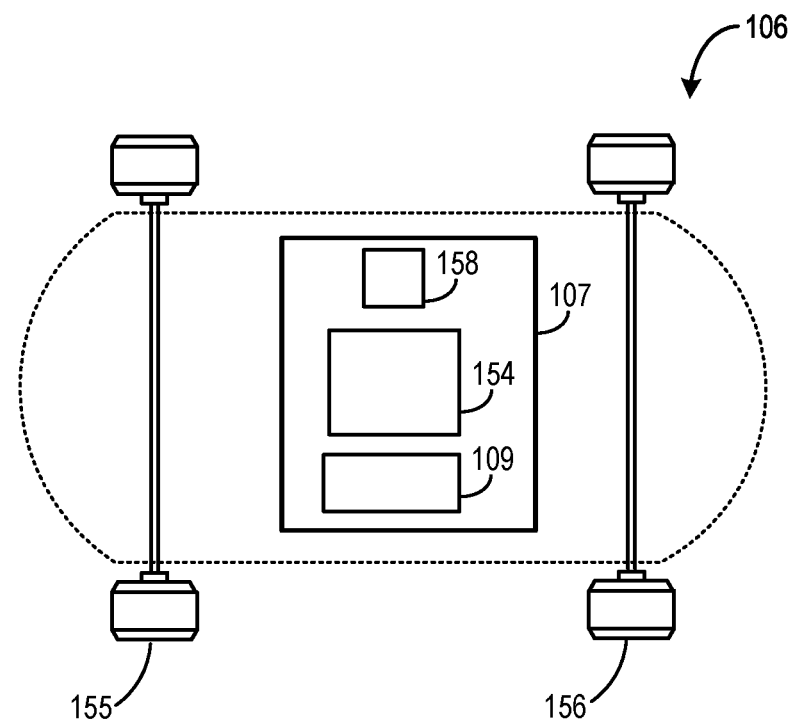
FIG. 1 shows a schematic depiction of a vehicle with a transmission, and an electric motor.
Figure 1:
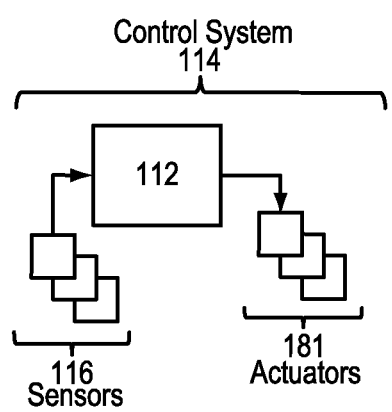

As shown in FIG. 1, a schematic depiction of a vehicle 106 (e.g., an off-highway vehicle) with a powertrain 107 that can derive propulsion power from one or more electric motors 154 (e.g., traction motor(s)) and transfers the power to a transmission 109, is shown. Specifically, in one example, the electric motors 154 may be traction motors. Thus, the powertrain is included in an electric drive. The vehicle 106 may specifically be an all-electric vehicle, in one example.

Electric motors 154 may receive electrical power from an energy storage device 158 (e.g., traction battery) to provide torque to vehicle wheels 155 and/or 156. Electric motors 154 may also be operated as generators to provide electrical power to charge energy storage device 158, for example, during a braking operation.

The transmission 109 may include a gearbox integrated therein. The electric motors 154 may be incorporated into the transmission 109. Additionally or alternatively, the electric motors 154 may be coupled to an outside of the transmission (e.g., gearbox housing). The integrated gearbox may include one or more input speed reduction gear sets. In one example, in the multi-speed transmission there are an equal number of drive speeds (e.g., in both forward drive and reverse drive operation), thereby increasing transmission performance.

Controller 112 may form a portion of a control system 114. Control system 114 may receive information from multiple sensors 116 and send control signals to a plurality of actuators 181. As one example, the sensors 116 may include sensors such as an energy storage device sensor, clutch activation sensor, etc. As another example, the plurality of actuators 181 may include a clutch, among others. Controller 112 may send a signal to an actuator of the clutches to engage or disengage the clutches, so as to couple or decouple power transmission from the electric motors 154 to the rear vehicle wheels 155 or the front vehicle wheels 156. The controller 112 may receive input data from the sensors 116, process the input data, and trigger the plurality of actuators 181 in response to the processed input data based on instruction or code programmed therein corresponding to one or more routines, and stored on a non-transitory memory. The control system 114 may be included in the transmission systems described in greater detail herein with regard to FIGS. 2-4I. The control system 114 shown in FIG. 1 may be used in any of the transmission embodiments described herein.

Figure 2:
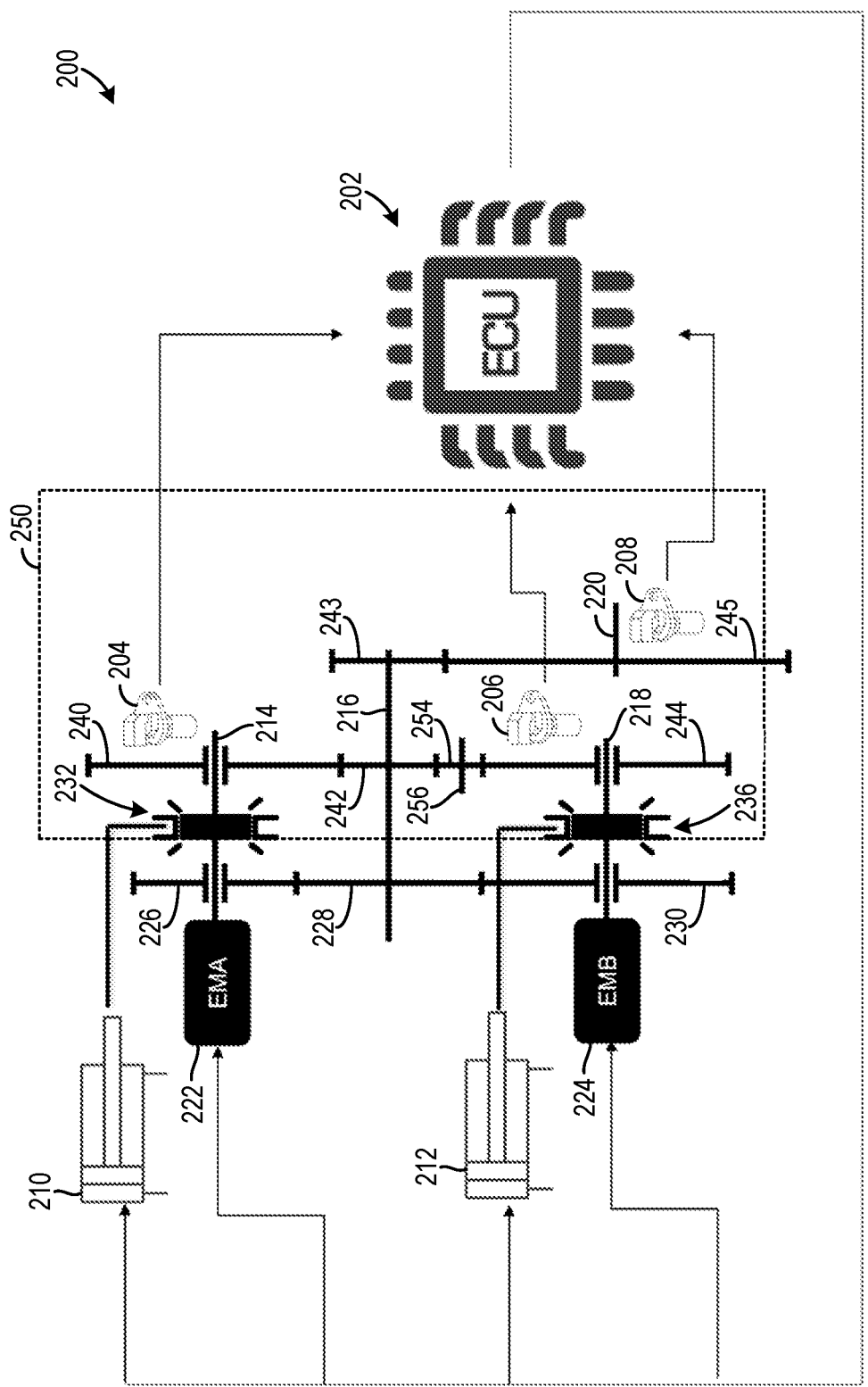
FIG. 2 shows an example of a multi-speed transmission system with dual electric motors.

Turning to FIG. 2, a diagram of an exemplary transmission system 200 for a vehicle is shown. It will be understood, that the transmission system 200 may be included in the vehicle 106 and specifically the powertrain 107, depicted in FIG. 1.

The transmission system 200 may include an electric motor 222 (e.g., a first electric motor) coupled to a first shaft 214. As described herein, numbering of components, such as the first shaft, a second shaft, etc. solely denote the order in which the components are introduced and do not denote any other component characteristics. As such, the first shaft 214 may be more generally referred to the shaft 214. Additionally, the component numbering may vary, in other examples. For instance, other sections of the application may use different component numbering which is based on the order in which the components are introduced.

A clutch 232 is arranged coaxial to the first shaft 214 and is designed to selectively rotationally couple different gears to the first shaft 214. As such, the clutch 232 is a multi-positioned clutch. In a first position, the clutch 232 engages a gear 226 such that the gear is rotationally coupled to the shaft 214. In a second position, the clutch 232 engages a gear 240 such that the gear is rotationally coupled to the shaft 214. Further, in a neutral position, the clutch 232 is disengaged from the gear 226 and the gear 240 and the gears therefore independently rotate with regard to the shaft. To induce the aforementioned engagement, the clutch 232 and the other clutches herein may include toothed faces that mate with toothed faces in the gears which they engage. Specifically, in the illustrated example, the clutch 232 is a dog clutch which exhibits increased efficiency when compared to wet friction clutches.

To elaborate, by utilizing dog clutches in the transmission, efficiency losses due to high drag torque related to the presence of wet friction clutches, such as dual-clutch transmissions, is decreased. In this way, seamless gearshifts with a decreased amount (e.g., null) of torque interruption, as described below with regards to FIGS. 2-4I, may be performed with less efficiency losses when compared to other transmission systems. Further, using dog clutches or other low friction clutches allows the transmission to implement powershifting without a clutch-to-clutch shifting where one friction clutch is increasing in engagement while the other is slipped and finally disengaged.

The gear 226 meshes with a gear 228 that is rotationally coupled to an intermediate shaft 216. Further, the gear 240 meshes with a gear 242 that is rotationally coupled to the intermediate shaft 216. Another gear 243 may be fixedly coupled to the intermediate shaft 216. In the illustrated example, the gear 243 meshes with a gear 245 that is fixedly coupled to a shaft 220 (e.g., an output shaft). The shaft 220 may be rotationally coupled to downstream components (e.g., drive axles) which are discussed in greater detail herein.

The transmission system 200 may include an electric motor 224 (e.g., a second electric motor) coupled to a shaft 218. A clutch 236 is positioned coaxial to a shaft 218 and is designed to selectively rotationally couple different gears to the shaft 218. As such, the clutch 236 is a multi-positioned clutch. In a first position, the clutch 236 engages a gear 230 such that the gear is rotationally coupled to the shaft 218. In a second position, the clutch 236 engages a gear 244 such that the gear is rotationally coupled to the shaft 218. Further, in a neutral position, the clutch 236 is disengaged from the gear 230 and the gear 244 and the gears therefore independently rotate with regard to the shaft.

The gear 244 meshes with a gear 254 (e.g., an idler gear) which rotates on an idler shaft 256. The gear 254 meshes with the gear 242. The gear 230 may be larger than the gear 226. In this way, the gear reductions associated with the lower speed drive range (e.g., first gear drive range) are not identical. In such an example, when the gears 226 and 230 are engaged by the clutches 232 and 236, respectively, the electric motors 222 and 224 will have different angular velocities with the same rotation direction. Having a difference in the first speed gear ratios increased the time span available for seamless shifting despite a lower vehicle speed where the shifting sequence starts. Further, the gear 240 may be identical in size to the gear 244. Thus, the gears 240 and 244 may be equally sized. Thus, the gear 254 allows the rotational direction of the input from the second motor to be reversed while the motors rotate at the same speed due to the equal sizing of the gears 240 and 244. To elaborate, to use the full power of both motors in a second speed drive range, the two motors may be geared to the output shaft with the same reduction ratio. In such an example, when the gears 240 and 244 are engaged by the clutches 232 and 236, the motors 222 and 224 will have the same angular velocity opposite in sign. Further, using the abovementioned gear sizing and layout (e.g., equally sizing the gears 240 and 244 and sizing the gear 230 larger than the gear 226) allows the transmission's space efficiency to be increased while achieving desired shifting performance characteristics. The gears 226 and 230 may be referred to as first speed gears which may be used in a first gear mode, when the vehicle is traveling at lower speeds. Further, in such an example, the gears 240 and 244 may be referred to as second speed gears which may be used in a second gear mode, when the vehicle is traveling at lower speeds. However, as discussed in greater detail herein the clutch 232 may engage the gear 230 and the clutch 236 may engage the gear 240 in a DR21 mode.

In some embodiments, the clutches 232 and 236 may be actuated via actuators 210 and 212, respectively, to enable the clutches to be placed in their different configurations. To elaborate, each actuator may be a hydraulic piston that moves a shift fork, in one specific example. However, other suitable types of actuators have been contemplated such as pneumatic actuators, electro-mechanical actuators, combinations thereof, and the like. Further, the actuators may be hydraulic actuators, electric actuators, linear actuators, or drum selectors, for example. In one embodiment, the transmission system 200 may include a single actuator, such as when operating a barrel cam device.

The transmission system 200 may further include the intermediate shaft 216 that may be oriented parallel to both of the shaft 214 and the shaft 218. In some embodiments, the shaft 214, the intermediate shaft 216, and the shaft 218 may be located on the same plane. As such, the intermediate shaft 216 may be located between the shaft 214 and the shaft 218. In other embodiments, the shaft 214, the intermediate shaft 216, and the shaft 218 may not be located on the same plane.

The electric motor 222 (e.g., traction motor) is coupled (e.g., directly coupled) to the shaft 214. In this way, the electric motor 222 is able to drive rotation of the shaft 214 during operation. The electric motor 222 and the electric motor 224 are both configured to rotate in opposing directions during different operating modes.

Transmission system 200 may further include a control system with an electronic control unit (ECU) 202 that executes instructions that obtain signals from multiple sensors and adjusts a one or more actuators to adjust the various components of the transmission system 200 to implement shifting between different operating gears. In all embodiments of the transmission system 200, the electric motor 222 and the electric motor 224 are not co-axial. However, the electric motor 222 and the electric motor 224 may be mounted on of the same side of the transmission or on opposite sides of the transmission. As shown in FIG. 2, the electric motor 222 and the electric motor 224 are mounted on the same side of the transmission.

In one embodiment, the gearbox housing is schematically denoted via a box 250. In particular, the gearbox housing may enclose all of the transmission shafts and gears, in one example. In other examples, some of the shafts and/or gears may be positioned external to the gearbox housing.

The various configurations of the transmission system 200 described herein utilize fewer gears than other transmission systems while achieving desired shifting performance characteristics. Consequently, the transmissions space efficiency is increased and manufacturing complexity is decreased.

As described above, the transmission system 200 may include the control system with multiple sensors, one or more actuators, and the electronic control unit (ECU) 202 with instructions stored in memory and executable by at least one processor of the ECU 202 to cause an adjustment of the one or more actuators based on data received by the plurality of sensors to perform gearshifts. The plurality of sensors may include speed sensors and clutch position sensors. The sensors may include sensors 204, 206, and 208 (e.g., speed sensors) which monitor the speed of the shafts 214, 216, and 218, respectively. In other embodiments, the speed of the shaft 214 may be inferred by the speed of the electric motor 222, the speed of the shaft 218 may be inferred by the speed of the electric motor 222, and the speed of the intermediate shaft 216 may be inferred by the vehicle speed based on the sizing of gears coupled to the intermediate shaft.

Alternatively, the shaft 214 speed may be provided by a controller area network (CAN) message from an inverter of the electric motor 222 and the shaft 218 speed may be provided by a CAN message from an inverter of the electric motor 224. Bearings may be coupled to the shafts 214, 216, and 218. To elaborate, bearings may be coupled to opposing ends of each of the shafts 214, 216, and 218.

Figure 3:
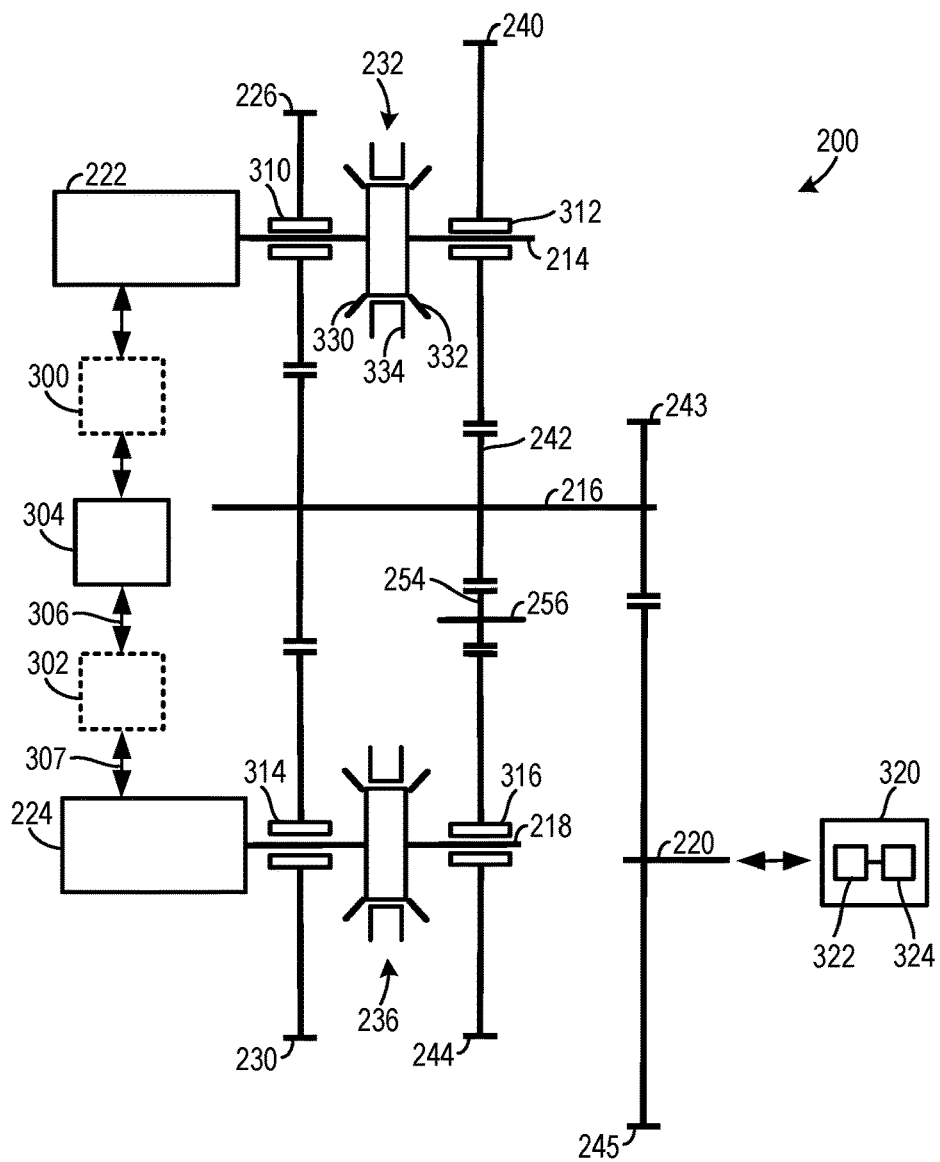
FIG. 3 shows the multi-speed transmission system depicted in FIG. 2 with the actuators and sensors omitted.

FIG. 3 shows the transmission system 200 with the actuators and sensors removed. Similar component numbering is utilized in FIGS. 2 and 3 and redundant component description is omitted for brevity. However, it will be understood that the transmission system 200 may include the previously described actuators, sensors, and control system, more generally.

Further, the electric motors 222 and 224 may be multi-phase traction motors that are supplied with electrical energy from inverters 300 and 302, respectively. The inverters 300 and 302 are configured to convert direct current (DC) to alternating current (AC) and vice versa. As such, the electric motors 222 and 224 may be AC traction motors. For instance, the motors and the inverters may be three-phase devices, in one use-case example. However, motors and inverters configured to operate using more than three phases have been contemplated. The electrical connection between the inverters and the electric motors is indicated via electrical lines (e.g., multi-phase wires). However, other suitable electrical connections may be established between the motors and the inverters.

The inverters 300 and 302 may receive DC power from at least one electrical energy source 304 (e.g., an energy storage device such as a traction battery, a capacitor, combinations thereof, and the like). Arrows 306 indicate the flow of electrical energy between the electrical energy source 304 and the inverters 300 and 302 and arrows 307 denote the flow of electrical energy between the inverters and the motors 222 and 224.

A bearing 310 is coupled to the gear 226 and the shaft 214 such that the gear 226 is idly mounted to the shaft. A bearing 312 is coupled to the gear 240 and the shaft 214 such that the gear 226 is idly mounted to the shaft. The clutch 232 may include a toothed face 330 which is profiled to engage a toothed face in the gear 226. The clutch 232 may further include a toothed face 332 that is profiled to engage a toothed face in the gear 240. The clutch 232 may further include a shift fork interface 334 which is designed to receive input from a shift fork or other suitable actuator. In this way, the clutch 232 may be a multi-position dog clutch which engages the gears 226 and 240 in different positions. The clutch 232 may also be configured with a neutral position where the clutch does not engage either of the gears 226 and 240. The clutch 236 may also be a multi-position clutch with a similar construction with regard to the toothed faces. For instance, the clutch 236, in one position, engages the gear 230, and in another position engages the gear 244. The clutch 236 may further have a neutral position. The gear 230 is idly mounted to the shaft 218 via a bearing 314 and the gear 244 is idly mounted to the shaft 218 via a bearing 316, in the illustrated example.

The shaft 220 may be rotationally coupled to one or more axle assemblies 320 which may each include a differential 322 which is rotationally coupled to drive wheels 324 via axle shafts. It will be appreciated that the relative sizing of the gears depicted in FIGS. 2 and 3 is to scale in the illustrated example. However, it will be understood that the gears may have alternate sizing in alternate examples.

FIG. 4A shows a table 400 that illustrates a multiple transmission drive ranges and corresponding states of the clutch 232 and the clutch 236, shown in FIGS. 2-3. The transmission drive ranges and corresponding states of the clutches may be realized via the control system described herein. The plurality of transmission drive ranges includes a transmission drive range DRNN, a transmission drive range DR11, a transmission drive range DRN1, a transmission drive range DR21, a transmission drive range DR2N, a transmission drive range DR22, a transmission drive range DRN2, and a transmission drive range DRIN. The sequence of the transmission drive ranges is sorted according to increasing vehicle speed, or conversely decreasing tractive effort capabilities. As such, the DR11 drive range denotes the maximum tractive effort, the DR22 drive range denotes maximum vehicle speed, and the DRNN drive range denotes a neutral transmission state. The transmission system may therefore sequentially transition between the illustrated drive ranges as the vehicle speed increases or decreases and/or based on other operating conditions.

The transmission drive ranges described above correspond to the operation states of the clutch 232 and the electric motor 222 as well as the clutch 236 and the electric motor 224. The rotational direction of the motors 222 and 224 are also denoted in FIG. 4A. To elaborate, the rotational direction of the motors corresponds to a forward direction of vehicle travel. However, it will be understood that the rotational directions of the motors are reversed for the reverse direction of vehicle travel. Thus, the motors may be rotated counterclockwise in DR11 and DR22 when the transmission is operated to propel the vehicle in a reverse direction of travel, for instance.

In the DRNN drive range, both the clutches 232 and 236 are in a neutral position and the motors 222 and 224 may be each be rotated in either rotational direction (e.g., clockwise or counterclockwise rotation).

In the DR11 drive range, both of the clutches 232 and 236 are engaging the first speed gears (e.g., gears 226 and 230). Further, in the DR11 drive range, the motors are rotated in clockwise directions.

In the DRN1 drive range, the clutch 232 is in the neutral configuration and the clutch 236 is engaging the first speed gear (e.g., gear 230). Further, in the DRN1 drive range, the motors are rotated in clockwise directions.

In the DR21 drive range, the clutch 232 is engaging the second speed gear (e.g., the gear 240) and the clutch 236 is engaging the first speed gear (e.g., the gear 230). Further, in the DR21 drive range, the motors are rotated in clockwise directions.

In the DR2N drive range, the clutch 232 is engaging the second speed gear (e.g., the gear 240) and the clutch 236 is in a neutral position. Further, in the DR2N drive range, the motors are rotated in clockwise directions.

In the DR22 drive range, the clutch 232 is engaging the second speed gear (e.g., the gear 240) and the clutch 236 is engaging the second speed gear (e.g., the gear 244). Further, in the DR22 drive range, the motors are rotated in opposite directions.

Further, in an optional drive range, DRN2, the clutch 232 is in the neutral positon and the clutch 236 is engaging the second speed gear (e.g., the gear 244). Further, in the DRN2 drive range, the motor 224 may be rotated in either direction.

Further, in an optional drive range, DRIN, the clutch 236 is in the neutral positon and the clutch 232 is engaging the first speed gear (e.g., the gear 226). Further, in the DRIN drive range, the motor 222 may be rotated in either direction.

Figure 4B:
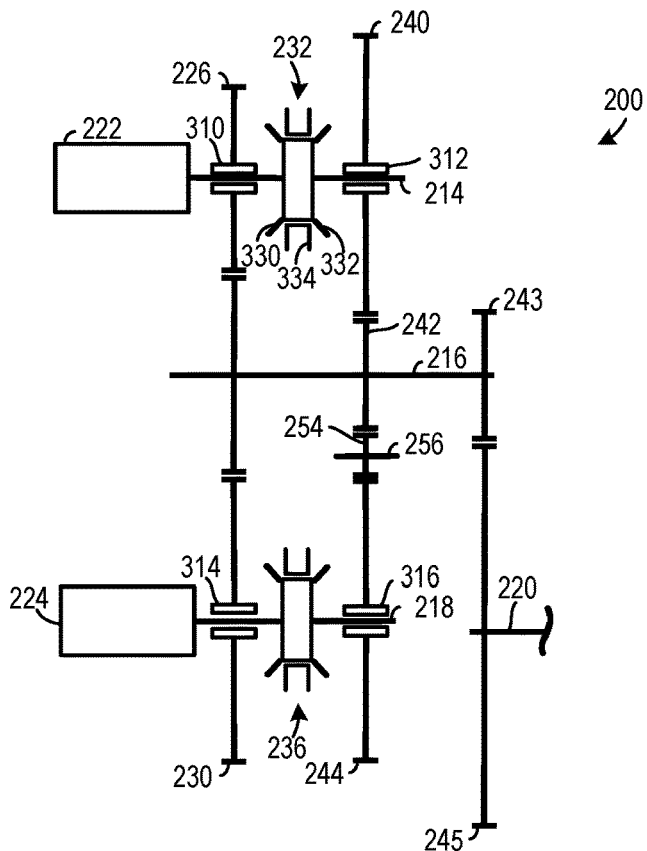
FIGS. 4B-4I show power paths for the transmission drive ranges depicted in FIG. 4A.

FIG. 4B shows the transmission system 200 in the DRNN drive range where the clutch 232 and the clutch 236 are in neutral positions. Further, in the DRNN drive range, the motors 222 and 224 may be rotated in either direction.

Figure 4C:
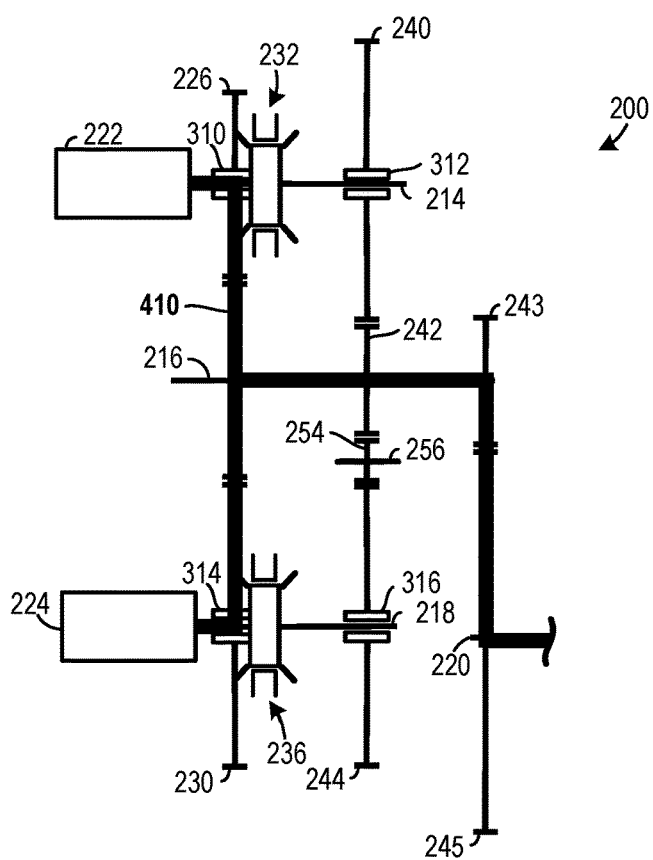

FIG. 4C shows the transmission system 200 in the DR11 drive range where the clutch 232 and the clutch 236 are engaging the first speed gears (e.g., gears 226 and 230, respectively). A mechanical power path 410 in the DR11 drive range is denoted in FIG. 4C.

Figure 4D:
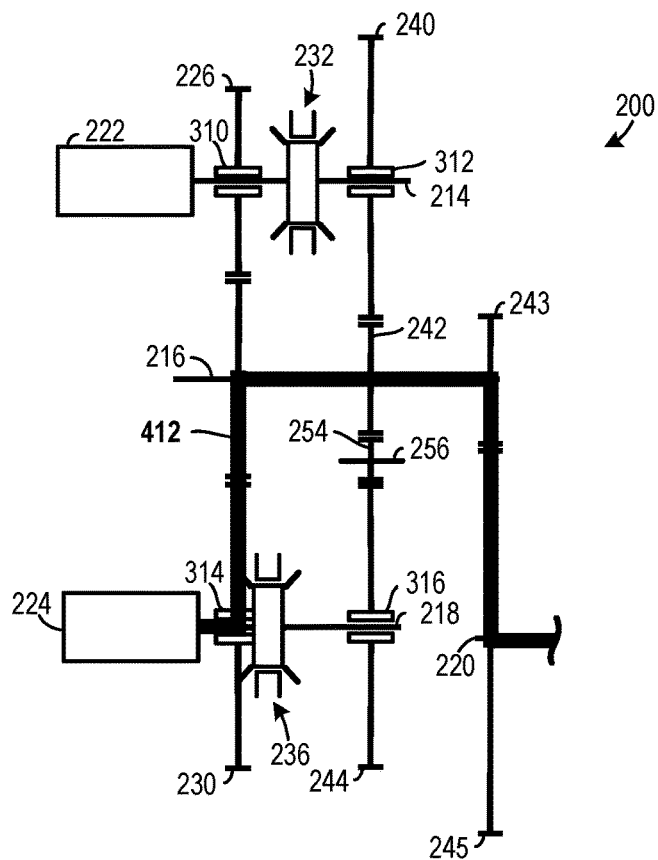

FIG. 4D shows the transmission system 200 in the DRN1 drive range where the clutch 232 is in a neutral position and the clutch 236 is engaging the first speed gear (e.g., the gear 230). A mechanical power path 412 in the DRN1 drive range is denoted in FIG. 4D.

Figure 4E:
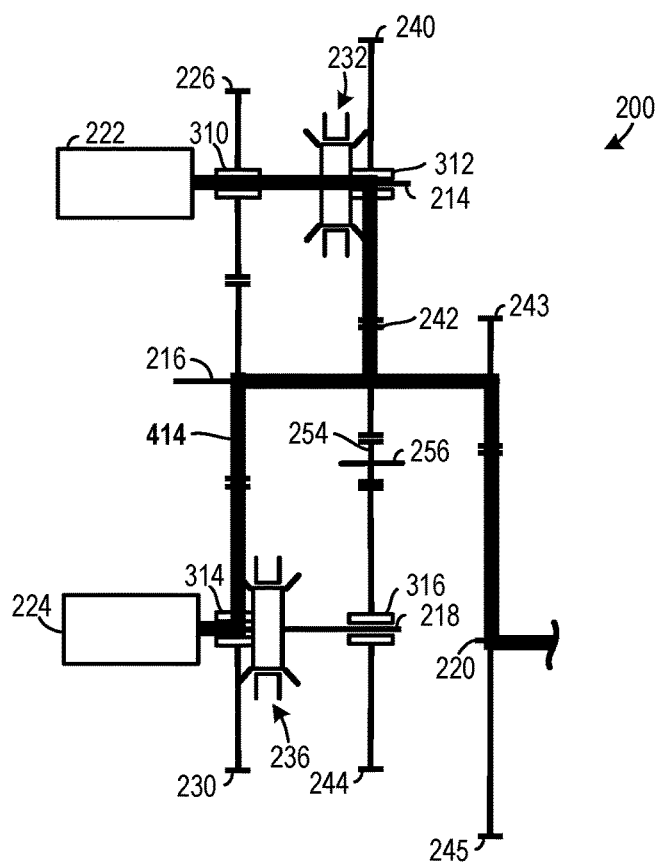

FIG. 4E shows the transmission system 200 in the DR21 drive range where the clutch 232 is engaging the second speed gear (e.g., the gear 240) and the clutch 236 is engaging the first speed gear (e.g., the gear 230). A mechanical power path 414 in the DR21 drive range is denoted in FIG. 4E.

Figure 4F:
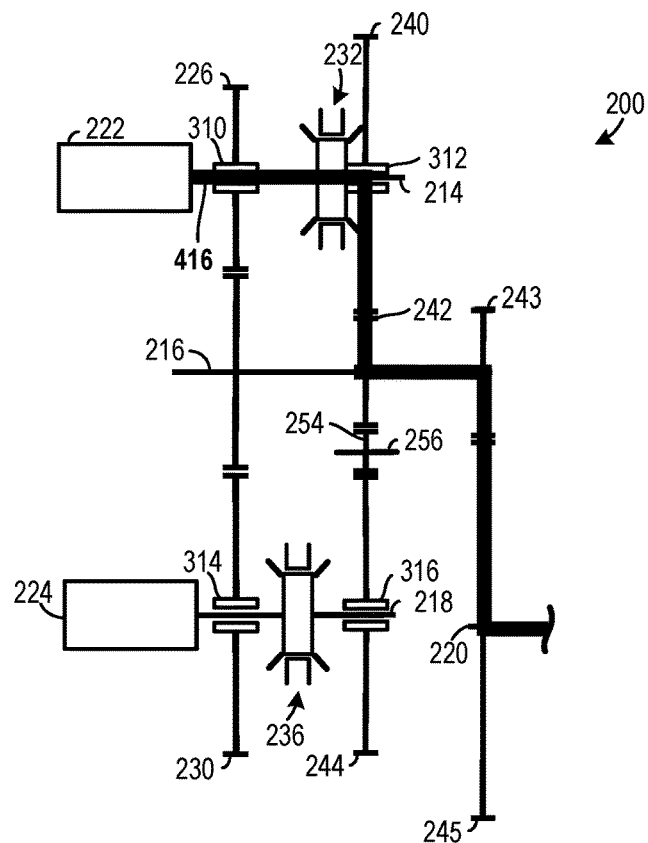

FIG. 4F shows the transmission system 200 in the DR2N drive range where the clutch 232 is engaging the second speed gear (e.g., the gear 240) and the clutch 236 is in a neutral position. A mechanical power path 416 in the DR2N drive range is denoted in FIG. 4F.

Figure 4G:
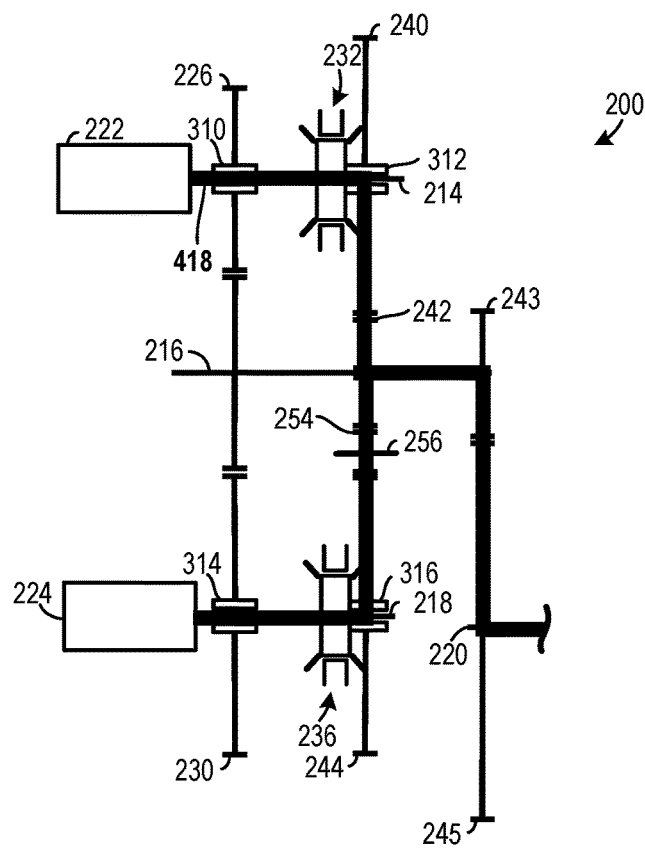

FIG. 4G shows the transmission system 200 in the DR22 drive range where the clutch 232 is engaging the second speed gear (e.g., the gear 240) and the clutch 236 is engaging the second speed gear (e.g., the gear 245). A mechanical power path 418 in the DR22 drive range is denoted in FIG. 4G.

Figure 4H:
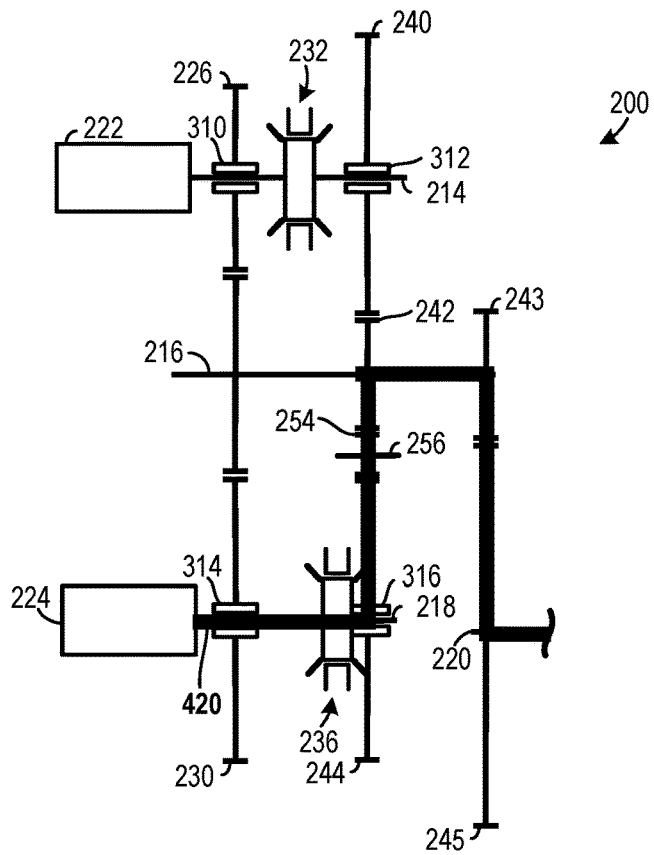

FIG. 4H shows the transmission system 200 in the DRN2 drive range where the clutch 232 is in a neutral position and the clutch 236 is engaging the second speed gear (e.g., the gear 244). A mechanical power path 420 in the DRN2 drive range is denoted in FIG. 4H.

Figure 4I:
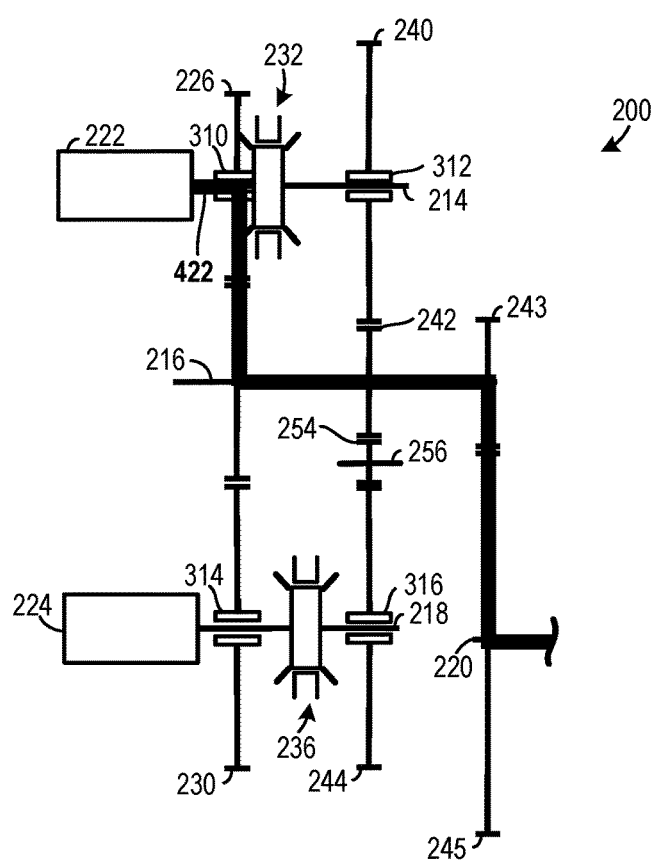

FIG. 4I shows the transmission system 200 in the DRIN drive range where the clutch 236 is in a neutral position and the clutch 232 is engaging the first speed gear (e.g., the gear 226). A mechanical power path 422 in the DRIN drive range is denoted in FIG. 4I.

Figure 5:
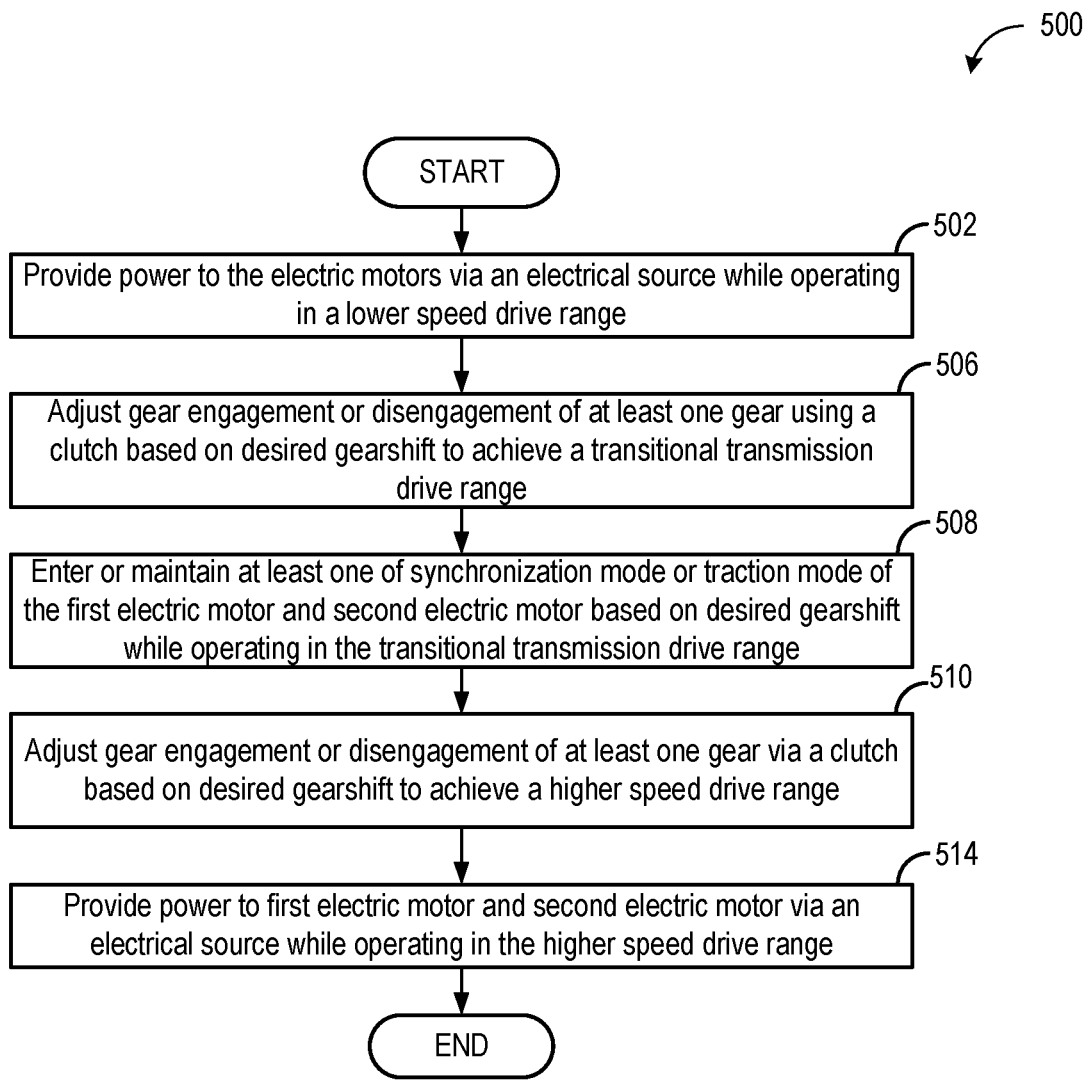
FIG. 5 shows a control method for implementing gearshifts in a transmission system.

FIG. 5 shows a method 500 for controlling an operation mode of a first electric motor and a second electric motor to realize multiple transmission drive ranges. Method 500 may be implemented by any of the transmission systems or combinations of transmission systems shown in FIGS. 1-4I, but it should be understood that similar methods may be used with other systems without departing from the scope of this disclosure. Instructions for carrying out method 500 may be executed by an electronic control unit (ECU) (such as ECU 202 of FIG. 2) based on instructions stored in memory of a controller in conjunction with signals received from sensors of the system, such as the sensors described above with reference to FIG. 2. The ECU may employ actuators of the system to adjust the transmission clutches, according to the methods described below.

At 502, the method 500 includes providing power to the electric motors via a power source while operating in a lower speed drive range. Electrical power may be provided independently to the first electric motor and the second electric motor via the power source(s). In this way, an electric current may be supplied to the first electric motor and the second electric motor to power the motors. While power is supplied to the first electric motor and the second electric motor, a transmission system may operate in the lower speed drive range.

At 506, the method 500 includes adjusting gear engagement and disengagement of at least one gear via a clutch via an actuator based on a desired gearshift to achieve a transitional transmission drive range. The transitional transmission drive range may include one of the transmission drive ranges wherein at least one of the two motors is in the neutral state (e.g., the transmission drive range DRN1 or the transmission drive range DR2N described above with respect to FIG. 4A). To enable the transitional transmission drive range, at least one of a gear ratio corresponding to the first electric motor or a gear ratio corresponding to the second electric motor may be engaged or disengaged based on whether the gear was originally disengaged or engaged.

In a first example, with the second electric motor not in a neutral state, the gear ratio for the first electric motor may originally be engaged, indicating that the first electric motor is operating at either a first speed or second speed of the first electric motor as described herein. By disengaging the gear in the gear ratio of the first electric motor, the first electric motor enters a neutral state and the whole system enters a transitional transmission drive range. In a second example, with the first electric motor not in a neutral state, a gear in the gear ratio of the second electric motor may originally be engaged, indicating that the second electric motor is operating at either a first speed or second speed of the second electric motor as described herein. By disengaging the gear in the gear ratio of the second electric motor, the second electric motor enters a neutral state and the whole system enters a transitional transmission drive range.

At 508, the method 500 includes entering or maintaining at least one of a synchronization mode or a traction mode of the first electric motor and second electric motor based on the desired gearshift while operating in the transitional transmission drive range. The synchronization mode is an operation mode for speed control and the traction mode is an operation mode for torque control. With regards to the traction mode, the traction mode may ensure that the desired torque is produced during operation. In particular, load of either the first electric motor or the second electric motor is maintained or adjusted to enable desired torque production by the first electric motor and the second electric motor or adjusted to compensate for decreases in torque of one of the first electric motor or the second electric motor. When motor synchronization is used in the transmission, synchronizer clutches may be omitted from the transmission, to simplify transmission architecture. However, in other examples, the dog clutches described herein may include synchronizers.

With respect to the synchronization mode, the respective electric motor speed may be decelerated or accelerated until a speed difference between the desired gear and the respective shaft coupled to the electric motor is within a pre-determined speed threshold. To achieve a speed within the pre-determined speed threshold, the speed of the respective electric motor (e.g., one of the first electric motor or the second electric motor) is decelerated or accelerated. Gear speed is determined by vehicle speed and cannot be controlled while shifting. Thus, the synchronization is realized by adjusting the speed of the respective motor instead of a mechanical synchronizer(s). However, other embodiments of the present disclosure may include the mechanical synchronizer(s) to increase efficiency of synchronization.

In some embodiments, both the first electric motor and the second electric motor may operate in the traction mode for the majority of operation and enter the synchronization mode when gearshifts are performed to change the speed of the respective motor. Returning to the first example described wherein the gear in the gear ratio of the first electric motor may originally be engaged and the gearshift caused the first electric motor to enter the neutral state and the transitional transmission drive range. After performing the gear shift, the first electric motor may enter the synchronization mode while the second electric motor, which did not experience a gearshift, may maintain operation in the traction mode. Turning to the second example wherein the gear in the gear ratio of the second electric motor may originally be disengaged and the gearshift caused the second electric motor to begin operating at the first speed of the second electric motor in the transitional transmission drive range. Similarly, after performing the gearshift, the second electric motor may enter the synchronization mode while the first electric motor, which did not experience a gearshift, may maintain operation in the traction mode.

At 510, the method 500 includes adjusting gear engagement and disengagement of at least one gear via an actuator based on a desired gearshift to achieve a higher speed drive range. To enable the higher speed drive range, at least one gear in one of a gear of the first electric motor or a gear mesh of the second electric motor may be engaged or disengaged based on whether the gear was originally disengaged or engaged.

Returning to the first example above wherein the gear in the gear ratio of the first electric motor may originally be engaged and the gearshift caused the first electric motor to enter the neutral state and the transitional transmission drive range. After entering the synchronous mode, a subsequent gearshift may be performed by engaging the gear to enable either the first speed or the second speed of the first electric motor depending on whether the first electric motor was originally operating at the second speed or first speed of the first electric motor. In this way, the higher speed drive range may be achieved via the gearshift.

Turning to the second example wherein the gear in the gear ratio of the second electric motor may originally be engaged and the gearshift caused the second electric motor to enter the neutral state and the transitional transmission drive range. After entering the synchronous mode, a subsequent gearshift may be performed by engaging the gear to enable either the first speed or the second speed of the second electric motor depending on whether the second electric motor was originally operating at the second speed or first speed of the second electric motor. In this way, the higher speed drive range may be achieved via the gearshift. After all the gearshifts are performed for either the first electric motor or the second electric motor, the first electric motor or the second electric motor may exit the synchronization mode and return to the traction mode.

Turning to the first example described above, the gear engagement and disengagement of the gear ratio of the second electric motor was maintained throughout the gearshifts. As such, the current supplied to the second motor was increased to compensate for the torque reduction of the first electric motor as gearshifts were performed.

At 514, the method 500 includes providing power to the first electric motor and the second electric motor while operating in the higher speed drive range. Electrical power may be provided independently to the first electric motor and the second electric motor via the power source(s). In this way, an electric current may be supplied to the first electric motor and the second electric motor to power the motors while operating in the higher speed drive range. The method 500 ends.

It may be understood that other embodiments of the method 500 may depart from the above without departing from the scope of the disclosure. For instance, the method may be implemented to shift from a higher speed range to a lower speed range. Further, shifts between the different transmission drive ranges shown in FIG. 4A may be implemented via a transmission system operating method.

Figure 6:
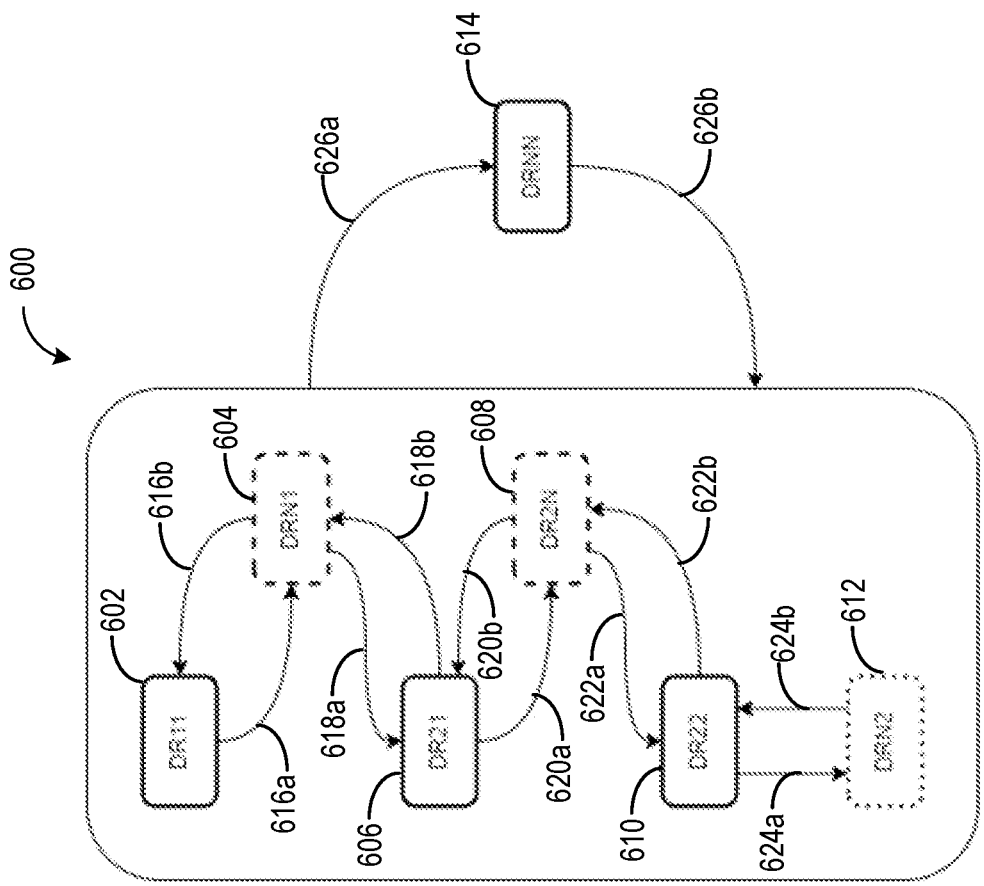
FIG. 6 shows a flow diagram for implementing gearshifts in a transmission system.

FIG. 6 shows a flow diagram 600 for implementing gearshifts to realize the drive ranges: DRNN, DRN1, DR21, DR2N, DR22, and DRN2. As illustrated in FIG. 6, boxes with solid lines denote the neutral transmission drive range and non-transitional drive ranges, boxes with dashed lines denote transitional transmission drive ranges, and boxes with dotted lines denote optional transmission drive ranges. A transmission system may operate the transmission drive ranges as described above, including the transmission drive range DRNN, the transmission drive range DR11, the transmission drive range DRN1, the transmission drive range DR21, the transmission drive range DR2N, the transmission drive range DR22, and the transmission drive range DRN2 as described herein. The gearshifts may be performed according to the systems and methods described herein in with respect to FIGS. 2-4I.

Depending on the series of gearshifts, the following transmission drive ranges, including the transmission drive range DR11, the transmission drive range DR21, and the transmission drive range DR22 may be considered non-transitional drive ranges. Similarly, the following plurality of transmission drive ranges, including the transmission drive range DRN1, the transmission drive range DR2N, and the transmission drive range DRN2 may be considered transitional transmission drive ranges.

At box 602, a transmission system, such as the transmission system 200 described above with respect to FIG. 2, is in the transmission drive range DR11. A gearshift 616a may enable the transmission system to obtain a first transitional transmission drive range at box 604, such as the transmission drive range DRN1 for example. As shown, a gearshift 616b may enable the transmission system to return to the transmission drive range DR11 from the transmission drive range DRN1. In this way, the transmission drive range DR11 may be considered a lower speed drive range in the gearshift 616a.

At box 606, the transmission system enters the transmission drive range DR21 via a gearshift 618a. As illustrated, a gearshift 618b may enable the transmission system to return to the transitional transmission drive range DRN1 from the transmission drive range DR21. At box 608, the transmission system enters the transitional transmission drive range DR2N via a gearshift 620a. As illustrated, a gearshift 620b enables the transmission system to return to the transmission drive range DR21 from the transitional transmission drive range DR2N.

At box 610, the transmission system enters the transmission drive range DR22 via a gearshift 622a. As illustrated, a gearshift 622b may enable the transmission system to return to the transitional transmission drive range DR2N from the transmission drive range DR22. At box 612, the transmission system may optionally enter a degraded motor management mode wherein as described herein, the first electric motor may be disconnected. Accordingly, the transmission system may enter an optional transmission drive range (e.g., the transmission drive range DRN2) via a gearshift 624a. As illustrated, a gearshift 624b may enable the transmission system to return to the transmission drive range DR22 from the transmission drive range DRN2. In other examples, the second electric motor may be disconnected when it is determined that the motor has been degraded.

In some embodiments, the transmission system may enter the neutral transmission drive range DRNN via a gearshift 626a at box 614. As such the transmission system may have originally been operating in a different transitional transmission drive range and the gearshift 626a allowed the transmission system to operate in the neutral transmission drive range DRNN. As one example, a different transitional transmission drive range may be enabled via a gearshift 626b. In this way, the transmission system may originally be operating in a neutral drive range (e.g., the transmission drive range DRNN) during certain operating conditions, such as during vehicle towing.

Figure 7:
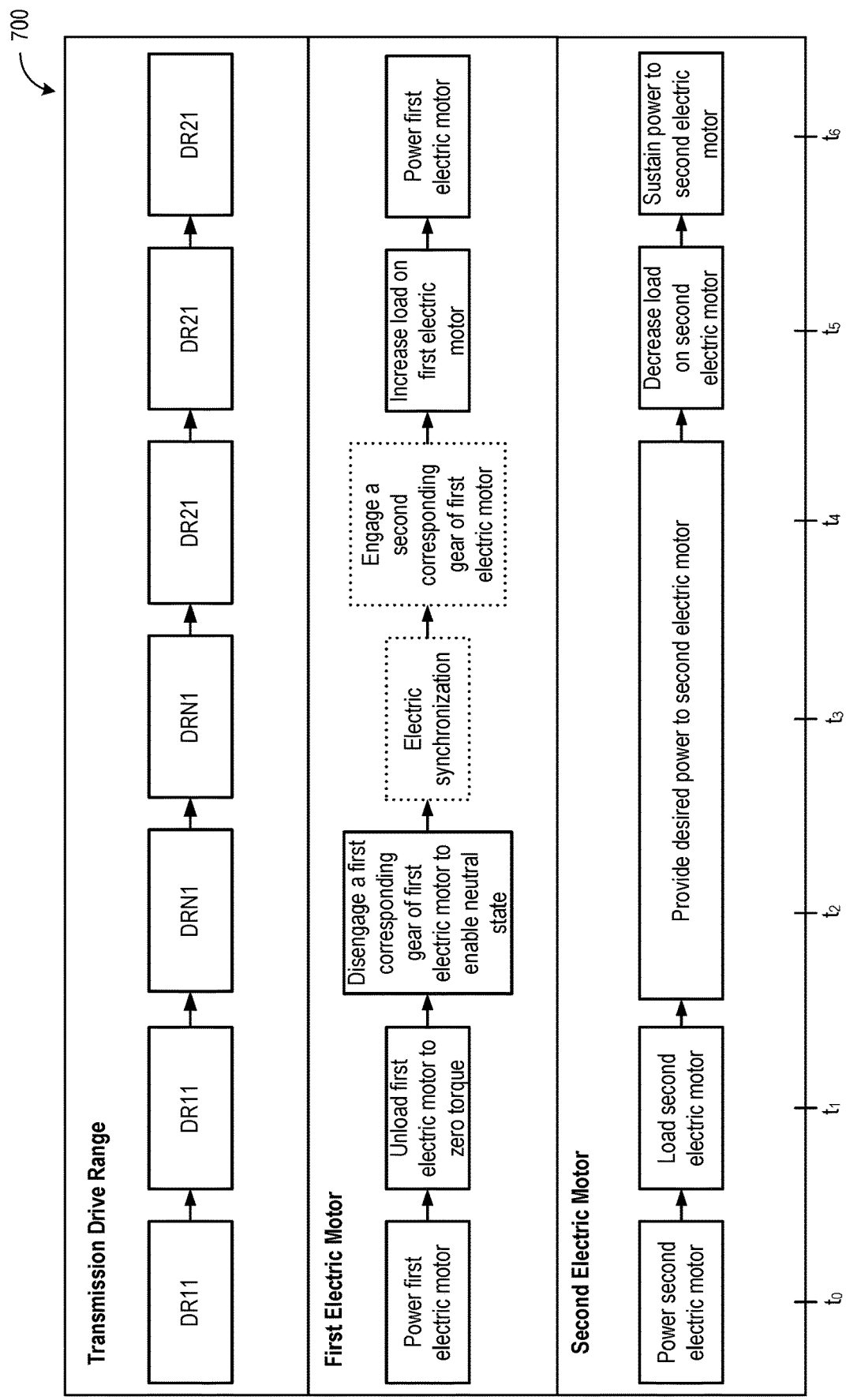
FIG. 7 shows a timing diagram for implementing a control method to perform gearshifts to realize a transmission drive range.

Turning to FIG. 7, a timing diagram 700 is illustrated wherein the control method as described herein is applied to a first electric motor and a second electric motor to achieve a transmission drive range via gearshift operation. At a time $t_0$, a vehicle is originally operating at a lower speed drive range DR11 wherein the first electric motor is operating at a first speed in traction mode (e.g., indicated by solid lines) and the second electric motor is operating at a second speed in traction mode (e.g., indicated by solid lines). Further, the first electric motor and the second electric motor are powered by a power source(s). The vehicle continues to operate at the transmission drive range DR11 and traction mode at $t_1$. In anticipation of a series of gearshifts of the first electric motor, the first electric motor is unloaded to zero torque and the second electric motor is loaded to a power that compensates for the reduction in power of the first electric motor.

At a time $t_2$, the desired power is provided to the second electric motor as a first corresponding gear of the first electric motor is disengaged to enable a neutral state of the first electric motor, realizing a transitional transmission drive range DRN1. In this way, torque reduction may be prevented by increasing the torque of the second electric motor to compensate for the decrease in torque from the first electric motor. If the second electric motor satisfies the torque demand, seamless shifting occurs. However, if the second electric motor does not satisfy the torque demand, torque dip may prevent seamless shifting. At a time $t_3$, the desired power continues to be provided to the second electric motor as electric synchronization compensates for the change in speed of the first electric motor in the transitional transmission drive range DRN1. As such, the first electric motor is operating in the synchronization mode (e.g., indicated by dotted lines) whereas the second electric motor is operating in the traction mode (e.g., indicated by solid lines). The speed of the first electric motor is decelerating to a value until a pre-determined speed threshold between the respective is realized.

The desired power continues to be provided to the second electric motor as a second corresponding gear of the first electric motor is engaged to enable the first electric motor to operate at a second speed of the first electric motor, enabling a higher speed drive range DR21 at a time t4. Further, the first electric motor continues to operate in the synchronization mode and the second electric motor continues to operate in the traction mode. At a time $t_5$, the load on the first and second motors is again shared such that the load on the first electric motor is decreased and the load on the second motor is increased while in the higher speed drive range DR21 in the traction mode. At time $t_6$ the first electric motor and second electric motor are powered in the higher speed drive range DR21 in the traction mode.

The transmission systems described herein enable gearshifts to be seamlessly implemented depending on the driving conditions and motor characteristics. Further, the electric motors in the systems may be decreased if desired, thereby increasing the system's space efficiency. Further, the transmission systems described herein allow one motor to continuously provide and maintain a desired power and tractive effort. Consequently, the duration of the shifting transient may be increased, if desired, thereby allowing the gearshift to be performed slowly and smoothly. Further, wet friction clutches may be omitted form the transmission systems described herein, if desired, thereby increasing transmission efficiency. Still further, the transmission systems described herein may exhibit a symmetric number of drive ratios in the forward/reverse drive modes. Even further, using two electric motors allows the system to be operated in a mode where one motor is disabled when it is determined that the motor or corresponding inverter has been degraded. Still further, in one example, if one motor becomes thermally degraded, a vehicle performance drop may be mitigated by temporarily peaking the other motor.

FIGS. 1-3 and 4A-4I show example configurations with relative positioning of the various components. If shown directly contacting each other, or directly coupled, then such elements may be referred to as directly contacting or directly coupled, respectively, at least in one example. Similarly, elements shown contiguous or adjacent to one another may be referred to as contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will be further described in the following paragraphs. In one aspect, a transmission system is provided that includes a first electric motor rotationally coupled to a shaft with a first gear idly mounted thereto, a second electric motor rotationally coupled to a second shaft with a second gear idly mounted thereto, an intermediate shaft with a third gear fixedly coupled thereto, a first clutch configured to selectively rotationally couple the first gear and the first shaft, and a second clutch configured to selectively rotationally couple the second gear and the second shaft, where the third gear meshes with the first gear and a fourth gear that meshes with the second gear, and where the first gear and the second gear are equally sized.

In another aspect, a method for operation of a transmission system is provided that includes operating a first electric motor and a second electric motor in opposing rotational directions while a first clutch and a second clutch engage a first gear and a second gear, where the transmission system includes the first electric motor rotationally coupled to a first shaft with the first gear idly mounted thereto, the second electric motor rotationally coupled to a second shaft with the second gear idly mounted thereto, an intermediate shaft with a third gear fixedly coupled thereto, and the first clutch configured to selectively rotationally couple the first gear and the first shaft, and the second clutch configured to selectively rotationally couple the second gear and the second shaft, where the third gear meshes with the first gear and a fourth gear that meshes with the second gear, and where the first gear and the second gear are equally sized.

In yet another aspect, an electric transmission system is provided that includes a first electric motor driving a first shaft with a first gear idly mounted thereto, a second electric motor driving a second shaft with a second gear idly mounted thereto, an intermediate shaft with a third gear fixedly coupled thereto, a fifth gear idly mounted to the first shaft, a sixth gear idly mounted to the second shaft, a seventh gear fixedly coupled to the intermediate shaft and meshing with the fifth gear and the sixth gear, a first dog clutch configured to selectively rotationally couple the first gear and the first shaft and the fifth gear and the first shaft in different configurations, and a second dog clutch configured to selectively rotationally couple the second gear and the second shaft and the sixth gear to the second shaft in different configurations, where the third gear meshes with the first gear and the second gear.

In any of the aspects or combinations of the aspects, the transmission system may further include a fifth gear idly mounted to the first shaft, a sixth gear idly mounted to the second shaft, and a seventh gear fixedly coupled to the intermediate shaft and meshing with the fifth gear and the sixth gear, wherein the first clutch is configured to selectively rotationally couple the fifth gear and the first shaft and the second clutch is configured to selectively rotationally couple the sixth gear and the second shaft, wherein the fifth gear and the sixth gear are unequally sized.

In any of the aspects or combinations of the aspects, the first clutch and the second clutch may be dog clutches.

In any of the aspects or combinations of the aspects, the transmission system may further include a controller that includes instructions that when executed cause the controller to operate the first clutch to rotationally couple the first gear and the first shaft, operate the second clutch to rotationally couple the second gear and the second shaft, and operate the first electric motor and the second electric motor at the same speed and in opposing rotational directions.

In any of the aspects or combinations of the aspects, the transmission system may further include a controller including instructions that when executed, during a shifting transient when the first clutch is in a neutral configuration, cause the controller to adjust a speed of the first electric motor based on a speed of the first gear, and when a speed difference between the first shaft and the first gear is below a threshold value, operate the first clutch to rotationally couple the first gear and the first shaft.

In any of the aspects or combinations of the aspects, the transmission system may have a symmetric number of drive ratios in a forward direction and a reverse direction.

In any of the aspects or combinations of the aspects, the transmission system may further include a final reduction that rotationally couples the intermediate shaft and an output shaft. In any of the aspects or combinations of the aspects, the transmission system may further include a differential directly coupled to the output shaft.

In any of the aspects or combinations of the aspects, the differential may be positioned coaxial to the output shaft.

In any of the aspects or combinations of the aspects, the first electric motor and the second electric motor may be parallel to one another.

In any of the aspects or combinations of the aspects, the first shaft, the second shaft, the intermediate shaft, the first electric motor, and the second electric motor may be parallel to one another.

In any of the aspects or combinations of the aspects, the transmission system may not include synchronizers.

In any of the aspects or combinations of the aspects, the method for operation of a transmission system may further include, when the first clutch is in a neutral configuration, adjusting a speed of the first motor based on a speed of the first gear, and when a speed difference between the first shaft and the first gear is below a threshold value, operating the first clutch to rotationally couple the first gear and the first shaft.

In any of the aspects or combinations of the aspects, the method for operation of a transmission system may further include, in response to determining degradation of the first electric motor, transitioning the first clutch into a neutral configuration and discontinuing operation of the first electric motor.

In any of the aspects or combinations of the aspects, the electric transmission system may further include a controller including instructions that when executed, in a second gear mode, cause the controller to operate the first dog clutch to rotationally couple the first gear and the first shaft, operate the second dog clutch to rotationally couple the second gear and the second shaft, and operate the first electric motor and the second electric motor at the same speed and in opposing rotational directions.

In any of the aspects or combinations of the aspects, the electric transmission system may further include a controller including instructions that when executed, in a first gear mode, cause the controller to operate the first dog clutch to rotationally couple the fifth gear and the first shaft, operate the second dog clutch to rotationally couple the sixth gear and the second shaft, and operate the first electric motor and the second electric motor in a same rotational direction.

In any of the aspects or combinations of the aspects, the electric transmission system may further include a controller including instructions that when executed, during a shifting transient, cause the controller to speed match the first shaft and the first gear or the fifth gear when the first dog clutch is in a neutral configuration.

In any of the aspects or combinations of the aspects, the first shaft, the intermediate shaft, and the second shaft may be arranged parallel to one another.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

The technical effect of the system operating methods described herein is that gearshifts may be seamlessly performed with increased efficiency, thereby increasing the system's shifting performance using a system that has less gears and other mechanical components.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system comprising:
a first electric motor rotationally coupled to a first shaft with a first gear idly mounted thereto;
a second electric motor rotationally coupled to a second shaft with a second gear idly mounted thereto;
an intermediate shaft with a third gear fixedly coupled thereto;
a first clutch configured to selectively rotationally couple the first gear and the first shaft; and
a second clutch configured to selectively rotationally couple the second gear and the second shaft; and
a controller including instructions that when executed, during a shifting transient when the first clutch is in a neutral configuration, cause the controller to:
adjust a speed of the first electric motor based on a speed of the first gear; and
when a speed difference between the first shaft and the first gear is below a threshold value, operate the first clutch to rotationally couple the first gear and the first shaft;
wherein the third gear meshes with the first gear and a fourth gear that meshes with the second gear; and
wherein the first gear and the second gear are equally sized.

2. The transmission system of claim 1, further comprising:
a fifth gear idly mounted to the first shaft;
a sixth gear idly mounted to the second shaft; and
a seventh gear fixedly coupled to the intermediate shaft and meshing with the fifth gear and the sixth gear, wherein the first clutch is configured to selectively rotationally couple the fifth gear and the first shaft and the second clutch is configured to selectively rotationally couple the sixth gear and the second shaft;
wherein the fifth gear and the sixth gear are unequally sized.

3. The transmission system of claim 1, wherein the first clutch and the second clutch are dog clutches.

4. The transmission system of claim 1, further comprising a controller including instructions that when executed cause the controller to:
operate the first clutch to rotationally couple the first gear and the first shaft;
operate the second clutch to rotationally couple the second gear and the second shaft; and
operate the first electric motor and the second electric motor at the same speed and in opposing rotational directions.

5. The transmission system of claim 1, wherein the transmission system has a symmetric number of drive ratios in a forward direction and a reverse direction.

6. The transmission system of claim 1, further comprising a final reduction that rotationally couples the intermediate shaft and an output shaft.

7. The transmission system of claim 6, further comprising a differential directly coupled to the output shaft.

8. The transmission system of claim 7, wherein the differential is positioned coaxial to the output shaft.

9. The transmission system of claim 1, wherein the first electric motor and the second electric motor are parallel to one another.

10. The transmission system of claim 9, wherein the first shaft, the second shaft, the intermediate shaft, the first electric motor, and the second electric motor are parallel to one another.

11. The transmission system of claim 1, wherein the transmission system does not include synchronizers.

12. A method for operation of a transmission system comprising:
operating a first electric motor and a second electric motor in opposing rotational directions while a first clutch and a second clutch engage a first gear and a second gear;
when the first clutch is in a neutral configuration, adjusting a speed of the first motor based on a speed of the first gear; and
when a speed difference between the first shaft and the first gear is below a threshold value, operating the first clutch to rotationally couple the first gear and the first shaft;
wherein the transmission system includes:
the first electric motor rotationally coupled to a first shaft with the first gear idly mounted thereto;
the second electric motor rotationally coupled to a second shaft with the second gear idly mounted thereto;
an intermediate shaft with a third gear fixedly coupled thereto; and
the first clutch configured to selectively rotationally couple the first gear and the first shaft; and
the second clutch configured to selectively rotationally couple the second gear and the second shaft;
wherein the third gear meshes with the first gear and a fourth gear that meshes with the second gear; and
wherein the first gear and the second gear are equally sized.

13. The method of claim 12, further comprising, in response to determining degradation of the first electric motor, transitioning the first clutch into a neutral configuration and discontinuing operation of the first electric motor.

14. An electric transmission system, comprising:
a first electric motor driving a first shaft with a first gear idly mounted thereto;
a second electric motor driving a second shaft with a second gear idly mounted thereto;
an intermediate shaft with a third gear fixedly coupled thereto;
a fifth gear idly mounted to the first shaft;
a sixth gear idly mounted to the second shaft;
a seventh gear fixedly coupled to the intermediate shaft and meshing with the fifth gear and the sixth gear;
a first dog clutch configured to selectively rotationally couple the first gear and the first shaft and the fifth gear and the first shaft in different configurations; and
a second dog clutch configured to selectively rotationally couple the second gear and the second shaft and the sixth gear to the second shaft in different configurations;
a controller including instructions that when executed, during a shifting transient, cause the controller to:
speed match the first shaft and the first gear or the fifth gear when the first dog clutch is in a neutral configuration;
wherein the third gear meshes with the first gear and the second gear.

15. The electric transmission system of claim 14, further comprising a controller including instructions that when executed, in a second gear mode, cause the controller to:

operate the first dog clutch to rotationally couple the first gear and the first shaft;

operate the second dog clutch to rotationally couple the second gear and the second shaft; and operate the first electric motor and the second electric motor at the same speed and in opposing rotational directions.

16. The electric transmission system of claim 15, further comprising a controller including instructions that when executed, in a first gear mode, cause the controller to:

operate the first dog clutch to rotationally couple the fifth gear and the first shaft;

operate the second dog clutch to rotationally couple the sixth gear and the second shaft; and operate the first electric motor and the second electric motor in a same rotational direction.

17. The electric transmission system of claim 14, wherein the first shaft, the intermediate shaft, and the second shaft are arranged parallel to one another.

\* \* \* \* \*